UNITED STATES PATENT OFFICE.

JOHN CARMODY, OF NEW YORK, N. Y.

IMPROVEMENT IN COMPOUNDS FOR COATING LEATHER.

Specification forming part of Letters Patent No. 161,203, dated March 23, 1875; application filed November 10, 1874.

*To all whom it may concern:*

Be it known that I, JOHN CARMODY, of the city, county, and State of New York, have invented a certain Compound for Coating Leather, &c., of which the following is a specification:

This invention has for its object the coating of leather and similar substances with a substitute for varnish, or, when varnish has been used, the restoring of its glossiness, by filling the pores and producing a smooth and polished surface; and the invention consists in the use of blood from any of the animals that will furnish red blood, as the mammalia, &c., cooling it as quickly as possible, so as to coagulate the fibrine, and then separate it from the serum by straining it or filtering it in any convenient manner, and then combining with said liquid, after the clot is so removed, a sufficient quantity of alcohol or other spirits to prevent decomposition, when it is ready for use.

This liquid, when applied to the surface of leather by rubbing it on with a sponge or cloth, will quickly dry, and, when afterward rubbed briskly with a dry woolen cloth, will give a bright and glossy coating to the leather, or to any surface which has been varnished and has become somewhat dingy, and requires to be restored, as patent-leather, varnished cloth, &c.

This compound is specially useful in its application to harness and carriage-covers in restoring their original glossiness, and it may be used immediately after oiling such articles, and when varnish would not produce any good result.

Any color may be given to this compound by combining with it some pigment, as lamp-black for black surfaces, and umber for the brown; but as the material itself will not change the color to any great degree, it will generally be found preferable to use it in its original color.

I do not claim the albumen of eggs or other pure albumen, as such is insoluble in alcohol. The material which I employ is cheaply prepared from blood by simply removing the clot. This liquid is a mixture of a number of chemical compounds, and the addition of alcohol or other equivalent preservative materials will not precipitate it or render it insoluble.

I therefore claim—

As a coating for leather, animal blood from which the clot has been removed, substantially as described, for the purpose specified.

JOHN CARMODY.

Witnesses:
 BOYD ELIOT,
 CHARLES H. LEONARD.